United States Patent
Hsu et al.

(10) Patent No.: US 9,965,098 B2
(45) Date of Patent: May 8, 2018

(54) CLAMSHELL ELECTRONIC DEVICE AND CALIBRATION METHOD CAPABLE OF ENABLING CALIBRATION BASED ON SEPARATED NUMBER OF COVER

(71) Applicant: Wistron Corp., New Taipei (TW)

(72) Inventors: Che-Hsuan Hsu, New Taipei (TW); Yung-Feng Chen, New Taipei (TW)

(73) Assignee: Wistron Corp., New Taipei (TW)

( * ) Notice: Subject to any disclaimer, the term of this patent is extended or adjusted under 35 U.S.C. 154(b) by 0 days. days.

(21) Appl. No.: 15/403,028

(22) Filed: Jan. 10, 2017

(65) Prior Publication Data

US 2017/0147146 A1 May 25, 2017

Related U.S. Application Data

(62) Division of application No. 14/195,809, filed on Mar. 3, 2014, now Pat. No. 9,600,119.

(30) Foreign Application Priority Data

Oct. 8, 2013 (TW) .............................. 102136284 A (51) Int. Cl.
  G06F 3/041 (2006.01)
  G06F 1/16 (2006.01)
  G06F 3/044 (2006.01)

(52) U.S. Cl.
  CPC .......... *G06F 3/0418* (2013.01); *G06F 1/1616* (2013.01); *G06F 1/1643* (2013.01); *G06F 3/044* (2013.01)

(58) Field of Classification Search
  CPC ....................................... G06F 3/044
  See application file for complete search history.

(56) References Cited

U.S. PATENT DOCUMENTS

| | | | | |
|---|---|---|---|---|
| 2004/0236843 A1* | 11/2004 | Wing | ...................... | H04L 29/06 709/219 |
| 2008/0100586 A1* | 5/2008 | Smart | .................. | G06F 3/0418 345/173 |
| 2010/0223508 A1* | 9/2010 | Imamura | ............... | G06F 11/008 714/47.2 |

* cited by examiner

*Primary Examiner* — Sanghyuk Park (57) ABSTRACT

The present disclosure provides a clamshell electronic device. The clamshell electronic device includes a touch module, a sensing device and a calculation unit. The touch module is arranged to detect touch events. The sensing device is arranged to detect whether an upper cover and a lower cover of the clamshell electronic device are separated, and produce a detecting signal when the upper cover and the lower cover are separated. The calculation unit is arranged to count the number of times the upper cover and the lower cover are separated according to the detecting signal to obtain a separated number, and calibrate the touch module when a predetermined condition is satisfied, wherein the predetermined condition comprises that the separated number is greater than a predetermined number.

8 Claims, 6 Drawing Sheets

CLAMSHELL ELECTRONIC DEVICE AND CALIBRATION METHOD CAPABLE OF ENABLING CALIBRATION BASED ON SEPARATED NUMBER OF COVER

CROSS REFERENCE TO RELATED APPLICATIONS

This Application is a divisional of U.S. patent application Ser. No. 14/195,809, filed on Mar. 3, 2014, which claims priority of Taiwan Patent Application No. 102136284, filed on Oct. 8, 2013, the entirety of which are incorporated by reference herein.

BACKGROUND OF THE DISCLOSURE

Field of the Disclosure

The present disclosure relates to a touch-calibration method for a clamshell electronic device, and in particular to an automatic touch-calibration method for the clamshell electronic device.

Description of the Related Art

Presently, mobile devices are highly developed and multi-functional. For example, handheld devices such as mobile phones and tablets are capable of conducting telecommunications, receiving and transmitting e-mails, maintaining social networks, managing contacts, and playing media. Hence, users can implement various applications on their mobile devices, such as a simple phone call, social network interaction, or commercial transactions. Therefore, mobile devices have become one of the necessities in people's lives.

Most of the current handheld devices include a touch module arranged to provide users with a method for inputting signals. The accuracy of the touch screen has become an important issue. It may cause inconvenience if users cannot precisely select on object through the touch screen.

BRIEF SUMMARY OF THE DISCLOSURE

A detailed description is given in the following embodiments with reference to the accompanying drawings.

The present disclosure provides a clamshell electronic device. The clamshell electronic device includes a touch module, a sensing device and a calculation unit. The touch module is arranged to detect touch events. The sensing device is arranged to detect whether an upper cover and a lower cover of the clamshell electronic device are separated, and produce a detecting signal when the upper cover and the lower cover are separated. The calculation unit is arranged to count the number of times the upper cover and the lower cover are separated according to the detecting signal to obtain a separated number, and calibrate the touch module when a predetermined condition is satisfied, wherein the predetermined condition comprises the separated number being greater than a predetermined number.

The present disclosure also provides a clamshell electronic device. The clamshell electronic device includes a touch module, a sensing device, a read-only memory and a processor. The touch module is arranged to detect touch events. The sensing device is arranged to detect whether an upper cover and a lower cover of the clamshell electronic device are separated, and produce a detecting signal when the upper cover and the lower cover are separated. The processor is arranged to perform a basic input output system and an operating system, wherein the basic input output system is arranged to count the number of times the upper cover and the lower cover are separated according to the detecting signal to obtain a separated number and store the separated number in the read-only memory, the operating system obtains an event number by an Advanced Configuration and Power Interface (ACPI) driver when the separated number is greater than a predetermined number, and the processor is arranged to perform an Advanced Configuration and Power Interface Source Language (ASL) code of the basic input output system according to the event number to enable the operating system to calibrate the touch module.

The present disclosure further provides a calibration method applied to a clamshell electronic device, wherein the clamshell electronic device includes a touch module. The calibration method includes detecting whether an upper cover and a lower cover of the clamshell electronic device are separated; producing a detecting signal when the upper cover and the lower cover are separated; counting the number of times the upper cover and the lower cover are separated according to the detecting signal to obtain a separated number; determining whether a predetermined condition is satisfied; and calibrating the touch module when the predetermined condition is satisfied, wherein the predetermined condition comprises the separated number being greater than a predetermined number.

Additionally, the present disclosure further provides a calibration method applied to a clamshell electronic device, wherein the clamshell electronic device comprises a touch module. The calibration method further includes detecting whether an upper cover and a lower cover of the clamshell electronic device are separated; producing a detecting signal when the upper cover and the lower cover are separated; performing a basic input output system to count the number of times the upper cover and the lower cover are separated according to the detecting signal to obtain a separated number and storing the separated number in the read-only memory; performing an operating system to obtain an event number by an ACPI driver when the separated number is greater than a predetermined number; and performing an ASL code of the basic input output system according to the event number to enable the operating system to calibrate the touch module.

BRIEF DESCRIPTION OF THE DRAWINGS

The present disclosure can be more fully understood by reading the subsequent detailed description and examples with references made to the accompanying drawings, wherein.

DETAILED DESCRIPTION OF THE DISCLOSURE

The following description is of the best-contemplated mode of carrying out the disclosure. This description is made for the purpose of illustrating the general principles of the disclosure and should not be taken in a limiting sense. The scope of the disclosure is best determined by reference to the appended claims.

Figure 1:
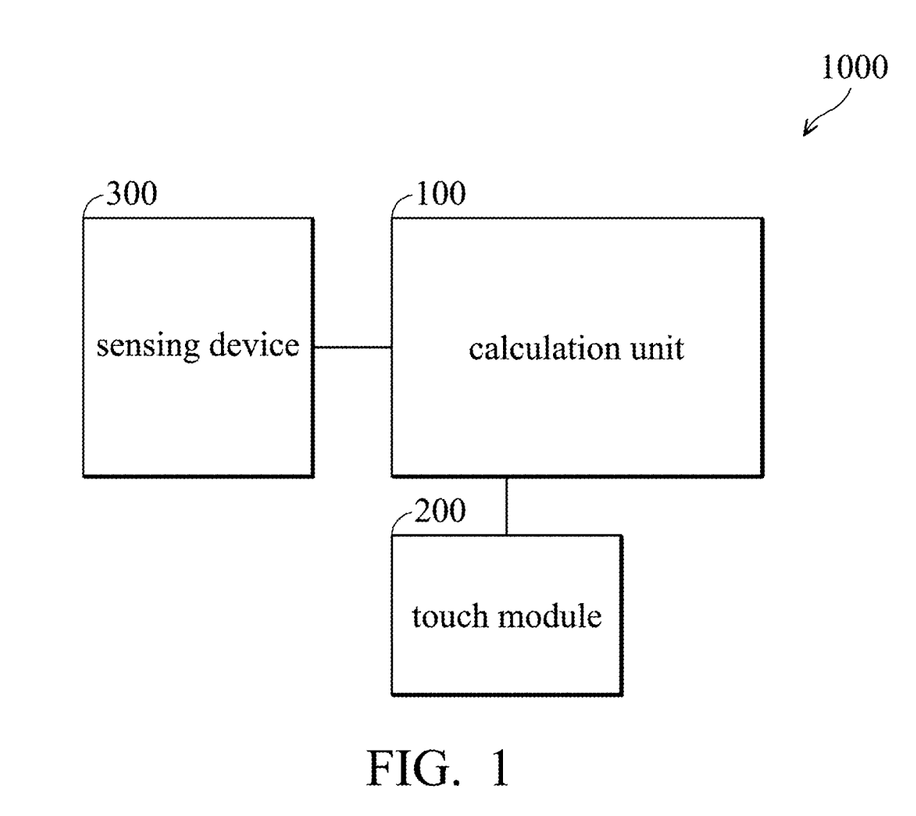
FIG. 1 is a schematic diagram illustrating an embodiment of a clamshell electronic device of the present disclosure.

FIG. 1 is a schematic diagram illustrating an embodiment of a clamshell electronic device of the present disclosure. The clamshell electronic device 1000 may include notebooks, smartphones, personal digital assistants, etc. The clamshell electronic device 1000 may be practiced with other computer system configurations, including handheld devices, portable devices, personal digital assistants (PDA), multiprocessor-based, microprocessor-based or programmable consumer electronics, and the like. The clamshell electronic device 1000 includes a calculation unit 100, a touch module 200 and a sensing device 300.

The calculation unit 100 may include a central-processing unit (CPU), or a plurality of parallel processing units related in a parallel processing environment. The memory device can include a read only memory (ROM), a flash ROM and/or a random access memory (RAM), arranged to store the programs used for executing by the calculation unit 100. In some embodiments, the program includes the routines, program, object, component, Web Service, etc.

The touch module 200 is arranged to detect touch events triggered by users. For example, the touch module 200 may be a touch panel or a touch pad, but it is not limited thereto. The touch panel may be covered on a display panel (not shown) of the clamshell electronic device 1000 or embedded in the display panel, wherein the touch panel is arranged to detect the gesture of users and the number of touch point(s) of the gesture. For example, the touch panel may be a capacitive touch panel, resistive touch panel, or projected capacitive touch panel, etc. The capacitive touch panel is arranged to detect touch events and the position of the touch events according to the capacitance change between the capacitive touch panel and user's hands or a touch pen to produce the corresponding signal to the calculation unit 100. The resistive touch panel is arranged to detect touch events and the position of the touch events according to the resistance change between the objects and the resistive touch panel to produce the corresponding signal to the calculation unit 100. The projected capacitive touch panel is arranged to detect touch events and the position of the touch events according to the capacitive sensing in response to the touch event preform by the user's hands or conductive objects on the Indium Tin Oxide (ITO) transparent electrode of the projected capacitive touch panel to produce the corresponding signal to the calculation unit 100. The touch pad may be disposed next to the keyboard (not shown) of the clamshell electronic device 1000 for detecting user gestures to control the cursor of the operating system, but it is not limited thereto.

The sensing device 300 is arranged to detect whether an upper cover and a lower cover of the clamshell electronic device 1000 are separated, and produce a detecting signal when the upper cover and the lower cover are separated. Furthermore, the sensing device 300 is arranged to transmit the detecting signal to the calculation unit 100. For example, the sensing device 300 may be a magnetic sensing device implemented on the upper cover and the lower cover of the clamshell electronic device 1000, and the magnetic sensing device is arranged to determine whether the upper cover and the lower cover are closed or opened according to the magnetic change, but it is not limited thereto. In other embodiments, the sensing device 300 may be an infrared sensing device, a light sensor or another sensing device arranged to determine whether the clamshell electronic device 1000 is closed or opened according to the physical changes in response to opening or closing the upper cover and the lower cover.

It should be noted that the clamshell electronic device 1000 of the present disclosure may be a tablet, wherein the tablet may achieve the feature of clamshell devices with an external device. For example, the clamshell electronic device 1000 which is a tablet with a smart cover can achieve the feature of the clamshell electronic device. In other words, the smart cover may be the upper cover or the lower cover of the clamshell electronic device 1000. It should be noted that the smart cover may be regarded as one of the components of the clamshell electronic device 1000, but it is not limited thereto. The smart cover may not be included in the clamshell electronic device 1000 in other embodiments. Although the smart cover is not one of the components of the clamshell electronic device 1000, the sensing device 300 can also determine whether the smart cover is separated from the electronic device 1000 according to the above physical change for determining whether the upper cover and the lower cover are separated. The sensing device 300 is also arranged to produce the detecting signal accordingly, and to transmit the detecting signal to the calculation unit 100. In other embodiments, the clamshell electronic device 1000 which is a tablet may also combine with a keyboard or another tablet for having the feature of clamshell electronic devices. It should be noted that the keyboard or another tablet may be one of the components of the clamshell electronic device 1000, but it is not limited thereto. The keyboard or another tablet may not be included in the clamshell electronic device 1000 in other embodiments. Although the keyboard or another tablet is not one of the components of the clamshell electronic device 1000, the sensing device 300 can also determine whether the keyboard or another tablet is separated from the electronic device 1000 according to the above physical change for determining whether the upper cover and the lower cover are separated. The sensing device 300 is also arranged to produce the detecting signal accordingly, and to transmit the detecting signal to the calculation unit 100.

In one of the embodiments, the calculation unit 100 is arranged to count the number of times the upper cover and the lower cover are separated according to the detecting signal to obtain a separated number, and calibrate the touch module 200 when a predetermined condition is satisfied. In one of the embodiments, the predetermined condition includes that the separated number is greater than a predetermined number, and the calculation unit 100 is further arranged to reset the separated number to zero when the separated number is greater than the predetermined number, but it is not limited thereto. It should be noted that the predetermined number may be 5 times, 10 times, 15 times, etc. In another embodiment, the predetermined condition includes the separated number being greater than the predetermined number and the driver of the touch module 200 is successfully installed on the clamshell electronic device 1000. For example, the calculation unit 100 is further arranged to determine whether the driver of the touch module 200 is successfully installed on the clamshell electronic device 1000 when the separated number is greater than the predetermined number. The calculation unit 100 is arranged to calibrate the touch module 200 when the driver of the touch module 200 is successfully installed on the clamshell electronic device 1000 for improving the accuracy of the determination of the touch module 200. When the driver is successfully installed on the clamshell electronic device 1000, the calculation unit 100 is arranged to provide a warning signal to the users for notifying the users that the driver of the touch module 200 is not successfully installed on the clamshell electronic device 1000, but it is not limited thereto. The calculation unit 100 may also do nothing, or search for the corresponding driver in the memory of the clamshell electronic device 1000 or on the internet to install the driver automatically or ask users for permission when the driver is not successfully installed on the clamshell electronic device 1000.

Figure 2:
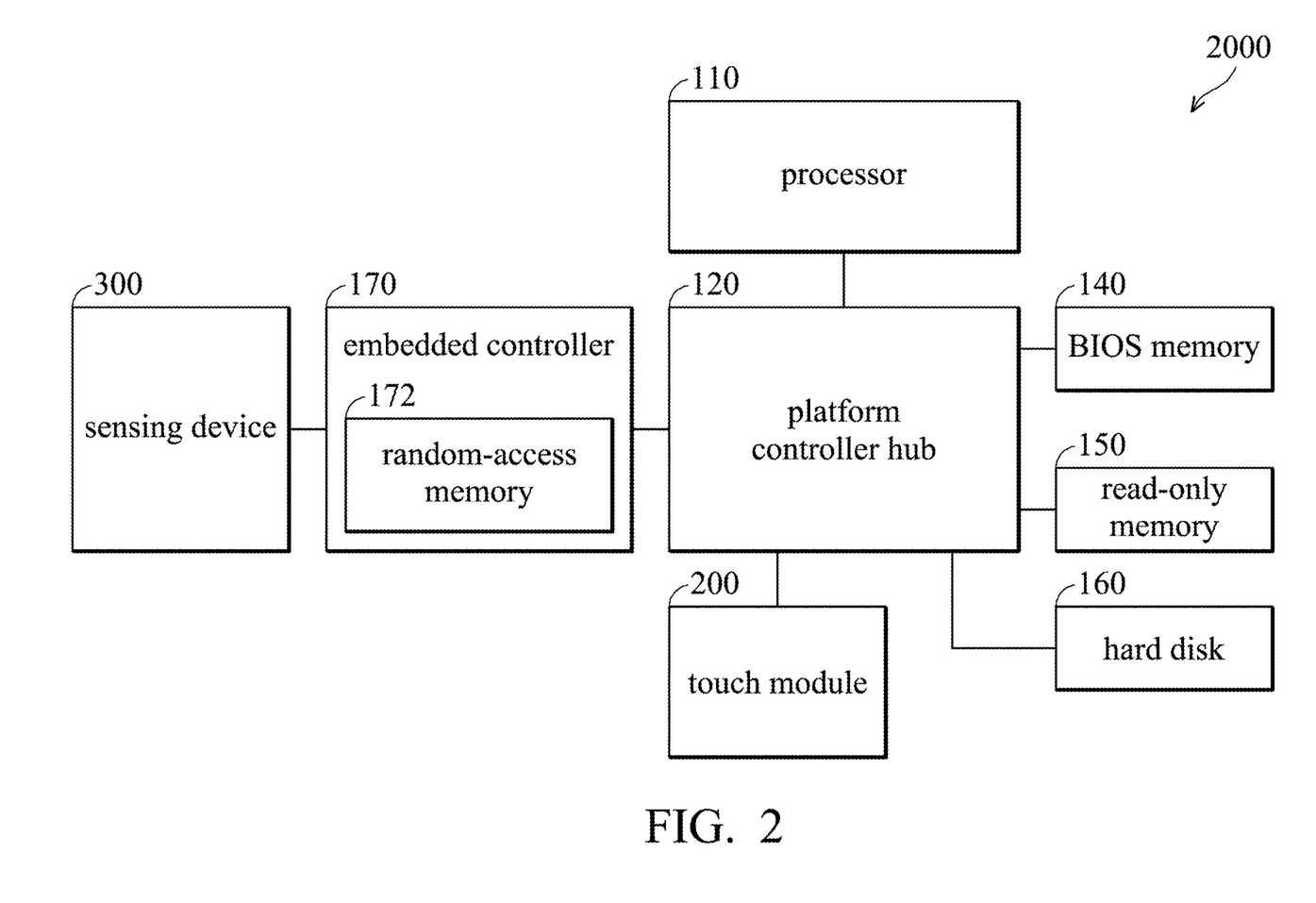
FIG. 2 is schematic diagram illustrating another embodiment of a clamshell electronic device of the present disclosure.

FIG. 2 is schematic diagram illustrating another embodiment of a clamshell electronic device of the present disclosure. The clamshell electronic device 2000 may be a notebook, a smartphone, a personal digital assistant, etc. The clamshell electronic device 2000 may be practiced with other computer system configurations, including handheld devices, portable devices, personal digital assistant (PDA), multiprocessor-based, microprocessor-based or programmable consumer electronics, and the like. The clamshell electronic device 2000 includes a processor 110, a platform controller hub 120, a BIOS memory 140, a read-only memory 150, a hard disk 160, an embedded controller 170, a touch module 200 and a sensing device 300.

The processor 110 may include a random access memory (not shown), and the processor 110 is further arranged to load the programs stored in the BIOS memory 140, the read-only memory 150 and the hard disk 160 in the random access memory through the platform controller hub 120 to perform.

The platform controller hub 120 is coupled between the processor 110 and other devices, such as the BIOS memory 140, the read-only memory 150, the hard disk 160, the embedded controller 170 and the touch module 200. The platform controller hub 120 is arranged to encode/decode data for the processor 110, such that the processor 110 can communicate with other devices. Furthermore, the platform controller hub 120 is further arranged to determine the program queue of the processor 110, and transmit commands from the processor 110 to other devices of the clamshell electronic device 2000.

The BIOS memory 140 is arranged to store the program code of a basic input output system (BIOS), and the program code is arranged to be provided to the processor 110 through the platform controller hub 120 for execution. For example, the BIOS memory 140 may be a Serial Peripheral Interface Read-Only Memory (SPI ROM), but it is not limited thereto. The BIOS memory 140 may be other non-volatile memories. It should be noted that, in the present disclosure, the basic input output system may include an ASL code (Advanced Configuration and Power Interface Source Language Code) arranged to check whether the driver of the touch module 200 is successfully installed on the clamshell electronic device 2000 and calibrate the touch module 200 for improving the accuracy of the determination of touch detect of the touch module 200.

The read-only memory 150 is arranged to store the parameters of the clamshell electronic device 2000. For example, the read-only memory 150 may be an Electrically-Erasable Programmable Read-Only Memory (EEPROM), but it is not limited thereto. The read-only memory 150 may be other non-volatile memories.

The hard disk 160 is arranged to store the programs of the clamshell electronic device 2000, such as the operating system (OS), drivers and other applications. It should be noted that, in the present disclosure, the hard disk 160 further includes an ACPI driver (Advanced Configuration and Power Interface) arranged to retrieve an event code from the embedded controller 170. It should be noted that, in this embodiment, the event number is a Q event number.

The embedded controller (EC) 170 is arranged to receive the detecting signal produced by the sensing device 300, and transmit the received detect signal to the processor 110 through the platform controller hub 120. The embedded controller 170 further includes a random-access memory (RAM) 172 arranged to store the parameters and the event numbers (Q event number), wherein the Q event numbers may be 0x0~0Xff corresponding to different events, but it is not limited thereto. The Q event number may be other digital codes. For example, the embedded controller 170 is also arranged to connect the other device of the clamshell electronic device 2000, such as keyboard, mouse, backlight module, etc., but it is not limited thereto. The components connected with the embedded controller 170 may trigger the corresponding events in response to the received specific signal, wherein the random-access memory 172 includes the Q event number. The embedded controller 170 is further arranged to transmit the received specific signal to the processor 110 through the embedded controller 170 and the platform controller hub 120, such that the operating system performed by the processor 110 can retrieve the corresponding Q event number from the random-access memory 172 of the embedded controller 170 according to the event corresponding to the specific signal. For example, the keyboard may trigger a hot-key event in response to the simultaneously enabled keys Fn and F3 for adjusting the backlight module, wherein the Q event number corresponding to the hot-key event is stored on the random-access memory 172.

The touch module 200 is arranged to detect touch events triggered by users. For example, the touch module 200 may be a touch panel or a touch pad, but it is not limited thereto. The touch panel may be covered on a display panel (not shown) of the clamshell electronic device 2000 or embedded in the display panel, wherein the touch panel is arranged to detect the gesture of users and the number of touch point(s) of the gesture. For example, the touch panel may be a capacitive touch panel, a resistive touch panel, or a projected capacitive touch panel, etc. The capacitive touch panel is arranged to detect touch events and the position of the touch events according to the capacitance change between the capacitive touch panel and user's hands or touch pen to produce the corresponding signal to the processor 110. The resistive touch panel is arranged to detect touch events and the position of the touch events according to the resistance change between the objects and the resistive touch panel to produce the corresponding signal to the processor 110. The projected capacitive touch panel is arranged to detect touch events and the position of the touch events according to the capacitive sensing in response to the touch event preform by the user's hands or conductive objects on the ITO transparent electrode of the projected capacitive touch panel to produce the corresponding signal to the processor 110. The touch pad may be deposed next to the keyboard (not shown) of the clamshell electronic device 2000 for detecting the user gestures to control the cursor of the operating system, but it is not limited thereto.

The sensing device 300 is coupled to the embedded controller 170, and the sensing device 300 is arranged to detect whether an upper cover and a lower cover of the clamshell electronic device 2000 are separated, and produce a detecting signal when the upper cover and the lower cover are separated. For example, the sensing device 300 may be a magnetic sensing device implemented on the upper cover and the lower cover of the clamshell electronic device 2000, and the magnetic sensing device is arranged to determine whether the upper cover and the lower cover are closed or opened according to the magnetic change, but it is not limited thereto. In other embodiments, the sensing device 300 may be infrared sensing devices, light sensors or other sensing devices arranged to determine whether the clamshell electronic device 2000 are closed or opened according to the physical changes in response to open or close the upper cover and the lower cover.

It should be noted that the clamshell electronic device 2000 of the present disclosure may be a tablet, wherein the tablet may achieve the feature of clamshell devices with an external device. the sensing device 300 can produce the detecting signal according to the physical change in response to the external device separating from the clamshell electronic device 2000, and transmit the detecting signal to the embedded controller 170. For example, the clamshell electronic device 2000 which is a tablet with a smart cover can achieve the feature of the clamshell electronic device. In other words, the smart cover may be the upper cover or the lower cover of the clamshell electronic device 2000. It should be noted that the smart cover may be regarded as one of the components of the clamshell electronic device 2000, but it is not limited thereto. The smart cover may not include in the clamshell electronic device 2000 in other embodiments. Although the smart cover is not one of the components of the clamshell electronic device 2000, the sensing device 300 can also determine whether the smart cover is separated from the electronic device 2000 according to the above physical change for determining whether the upper cover and the lower cover are separated. The sensing device 300 is also arranged to produce the detecting signal, accordingly, and transmit the detecting signal to the embedded controller 170. In other embodiments, the clamshell electronic device 2000 which is a tablet may also combine with a keyboard or another tablet for having the feature of clamshell electronic devices. It should be noted that, the keyboard or another tablet may be one of the components of the clamshell electronic device 2000, but it is not limited thereto. The keyboard or another tablet may not include in the clamshell electronic device 2000 in other embodiments. Although the keyboard or another tablet is not one of the components of the clamshell electronic device 2000, the sensing device 300 can also determine whether the keyboard or another tablet is separated from the electronic device 2000 according to the above physical change for determining whether the upper cover and the lower cover are separated. The sensing device 300 is also arranged to produce the detecting signal, accordingly, and transmit the detecting signal to the embedded controller 170.

In one of the embodiments, the processor 110 is arranged to perform a basic input output system to count the number of times the upper cover and the lower cover are separated to obtain a separated number to store in the read-only memory 150 according to the detecting signal produced by the sensing device. When the operating system performed by the processor 110 determines that the separated number stored in the read-only memory 150 is greater than a predetermined number, the operating system obtains the event number stored in the random-access memory 172 of the embedded controller 170 by the ACPI driver. It should be noted that the predetermined number may be 5 times, 10 times, 15 times, etc., it is not limited thereto. Next, the processor 110 is arranged to perform the ASL code of the basic input output system to calibrate the touch module 200 according to the event number. In another embodiment, when the separated number is greater than the predetermined number, the operating system performed by the processor 110 is arranged to reset the separated number stored in the read-only memory 150 to zero by the ACPI driver, but it is not limited thereto.

In one of the embodiments, when the separated number is greater than the predetermined number, the ASL code enables a calibration program to calibrate the touch module 200 for improving the accuracy of the touch module 200. For example, the calibration program may be stored in the touch module 200 or the hard disk 160, but it is not limited thereto. In another embodiment, the ASL code is arranged to detect whether a device management interface of the operating system has an error code (Device Manager error code) corresponding to the touch module 200 or not to determine whether the driver of the touch module 200 is successfully installed on the clamshell electronic device 2000. When the driver is successfully installed on the clamshell electronic device 2000, the ASL code enables a calibration program of the operating system to calibrate the touch module 200 for improving the accuracy of the determination of the touch event of the touch module 200. When the driver is not successfully installed on the clamshell electronic device 2000, the ASL code is further arranged to provide a warning signal to the operating system for notifying the users that the driver of the touch module 200 is not successfully installed on the clamshell electronic device 2000, but it is not limited thereto. In another embodiment, when the driver is not successfully installed on the clamshell electronic device 2000, the ASL code may also do nothing or enable the operating system to search the corresponding driver on the memory of the clamshell electronic device 2000 or internet to install the searched driver automatically or ask users for permission when the driver is not successfully installed on the clamshell electronic device 2000.

Figure 3:
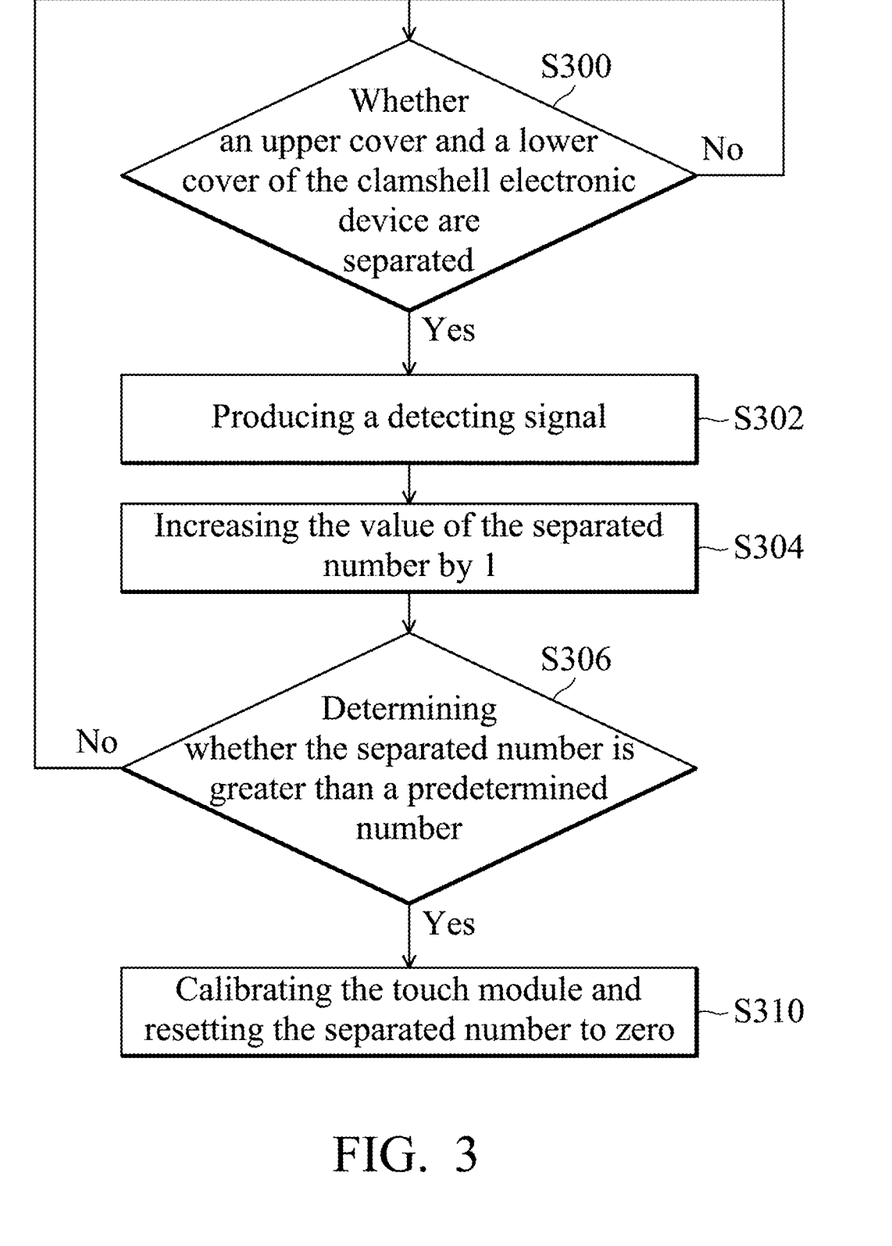
FIG. 3 is a flowchart of a calibration method according to an embodiment of the present disclosure.

FIG. 3 is a flowchart of a calibration method according to an embodiment of the present disclosure. The calibration method is applied to the clamshell electronic device 1000 of FIG. 1. The process starts at step S300.

In step S300, the sensing device 300 is arranged to detect whether an upper cover and a lower cover of the clamshell electronic device 1000 are separated. For example, the sensing device 300 may be a magnetic sensing device implemented on the upper cover and the lower cover of the clamshell electronic device 1000, and the magnetic sensing device is arranged to determine whether the upper cover and the lower cover are closed or opened according to the magnetic change, but it is not limited thereto. In other embodiments, the sensing device 300 may be infrared sensing devices, light sensors or other sensing devices arranged to determine whether the clamshell electronic device 1000 is closed or opened according to the physical changes in response to open or close the upper cover and the lower cover. When the upper cover and the lower cover are separated, the process goes to step S302, otherwise, the sensing device 300 continuous to detect whether the upper cover and the lower cover of the clamshell electronic device 1000 are separated.

It should be noted that the clamshell electronic device 1000 of the present disclosure may be a tablet, wherein the tablet may achieve the feature of clamshell devices with an external device. For example, the clamshell electronic device 1000 which is a tablet with a smart cover can achieve the feature of the clamshell electronic device. In other words, the smart cover may be the upper cover or the lower cover of the clamshell electronic device 1000. It should be noted that the smart cover may be regarded as one of the components of the clamshell electronic device 1000, but it is not limited thereto. The smart cover may not include in the clamshell electronic device 1000 in other embodiments. Although the smart cover is not one of the components of the clamshell electronic device 1000, the sensing device 300 can also determine whether the smart cover is separated from the electronic device 1000 according to the above physical change for determining whether the upper cover and the lower cover are separated. The sensing device 300 is also arranged to produce the detecting signal, accordingly, and transmit the detecting signal to the calculation unit 100. In other embodiments, the clamshell electronic device 1000 which is a tablet may also combine with a keyboard or another tablet for having the feature of clamshell electronic devices. It should be noted that, the keyboard or another tablet may be one of the components of the clamshell electronic device 1000, but it is not limited thereto. The keyboard or another tablet may not be included in the clamshell electronic device 1000 in other embodiments. Although the keyboard or another tablet is not one of the components of the clamshell electronic device 1000, the sensing device 300 can also determine whether the keyboard or another tablet is separated from the electronic device 1000 according to the above physical change for determining whether the upper cover and the lower cover are separated. The sensing device 300 is also arranged to produce the detecting signal, accordingly, and transmit the detecting signal to the calculation unit 100.

Next, in step S302, the sensing device 300 produces a detecting signal, and transmits the detecting signal to the calculation unit 100.

Next, in step S304, the calculation unit 100 is arranged to add the separated number by 1 according to the detecting signal, wherein the separated number corresponds to the number of times that the upper cover and the lower cover are separated.

Next, in step S306, the calculation unit 100 determines whether the separated number is greater than a predetermined number. When the separated number is greater than the predetermined number, the process goes to step S310, otherwise, the process returns to step S300 and the sensing device 300 continuous to detect whether the upper cover and the lower cover are separated. It should be noted that the predetermined number may be 5, 10, 15, etc., but it is not limited thereto.

In step S310, the calculation unit 100 calibrates the touch module 200 for improving the accuracy of the touch module 200, and resets the separated number to zero. The process ends at step S310.

Figure 4:
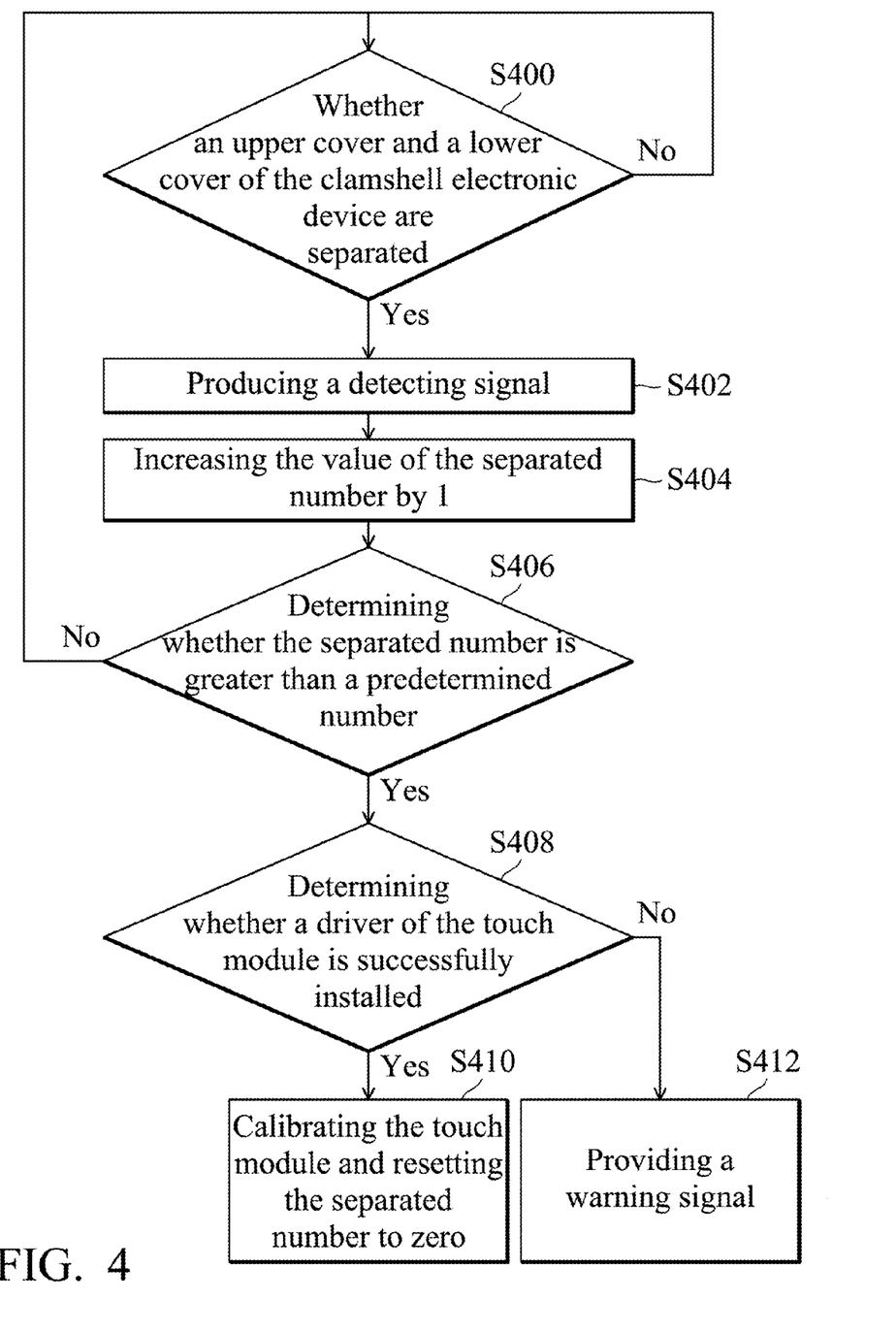
FIG. 4 is a flowchart of a calibration method according to another embodiment of the present disclosure.

FIG. 4 is a flowchart of a calibration method according to another embodiment of the present disclosure. The calibration method is applied to the clamshell electronic device 1000 of FIG. 1. The process stars at step S400, wherein the method of FIG. 4 is similar to FIG. 3, expect that the method of FIG. 4 further includes steps S408 and S412. Therefore, the details of steps S400-S404 can be referred to the description of steps S300-S304.

Next, in step S406, the calculation unit 100 determines whether the separated number is greater than a predetermined number. When the separated number is greater than a predetermined number, the process goes to step S408, otherwise, the process returns to step S400 and the sensing device 300 continuous to detect whether the upper cover and the lower cover are separated. It should be noted that the predetermined number may be 5, 10, 15, etc., but it is not limited thereto.

Next, in step S408, the calculation unit 100 is further arranged to determine whether a driver of the touch module 200 is successfully installed on the clamshell electronic device 1000. When the driver of the touch module 200 is successfully installed on the clamshell electronic device 1000, the process goes to step S410, otherwise, the process goes to step S412.

Next, in step S410, the calculation unit 100 calibrates the touch module 200 for improving the accuracy of the touch module 200, and reset the separated number to zero. The process ends at step S410.

In step S412, the calculation unit 100 provides a warning signal to inform users that the driver of the touch module 200 is not successfully installed on the clamshell electronic device 1000. The process ends at step S412.

Figure 5:
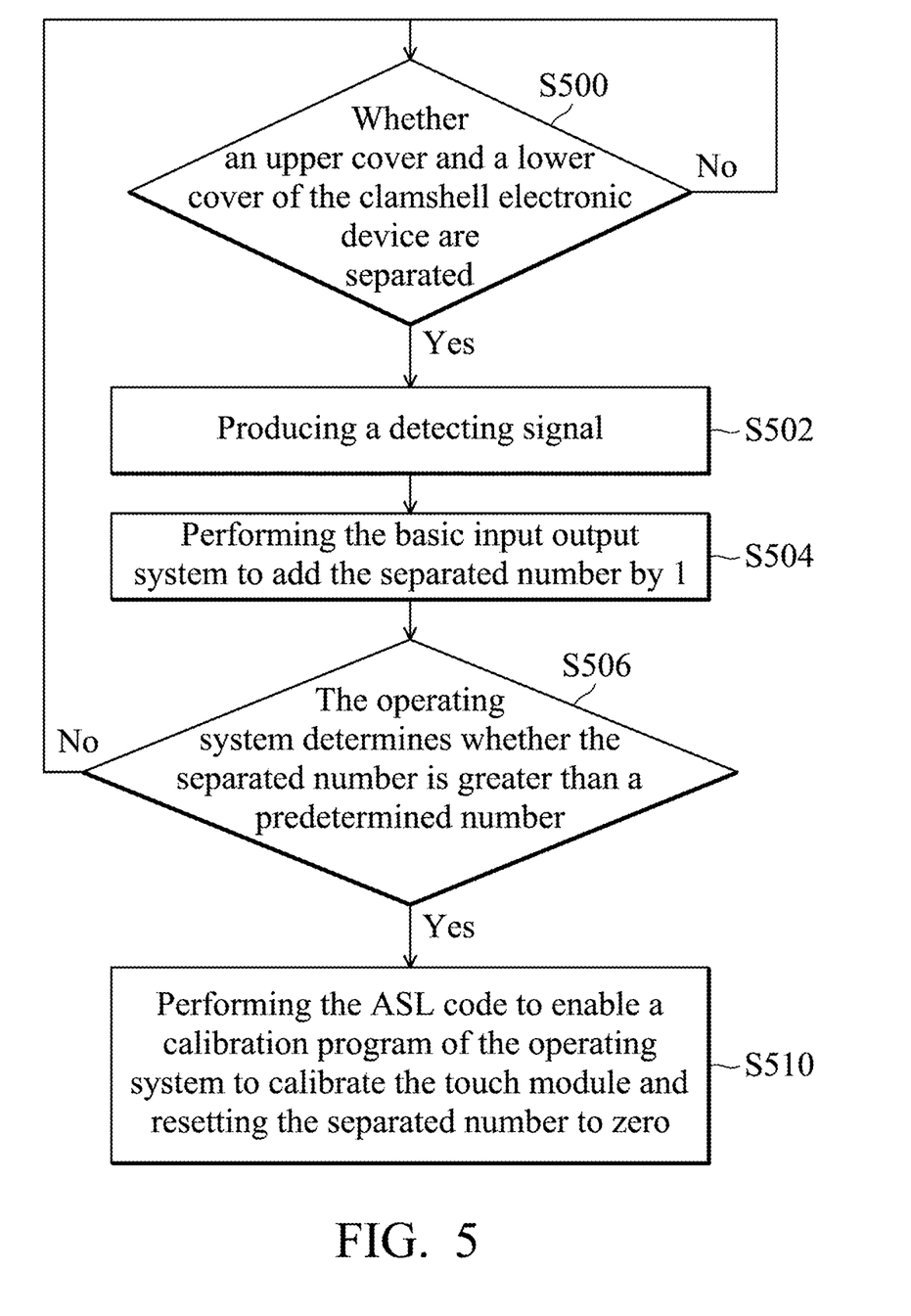
FIG. 5 is a flowchart of a calibration method according to another embodiment of the present disclosure.

FIG. 5 is a flowchart of a calibration method according to another embodiment of the present disclosure. The calibration method is applied to the clamshell electronic device 2000 of the FIG. 2. The process starts at step S500.

In step S500, the sensing device 300 is arranged to detect whether the upper cover and the lower cover of the clamshell electronic device 2000 are separated. For example, the sensing device 300 may be a magnetic sensing device implemented on the upper cover and the lower cover of the clamshell electronic device 2000, and the magnetic sensing device is arranged to determine whether the upper cover and the lower cover are closed or opened according to the magnetic change, but it is not limited thereto. In other embodiments, the sensing device 300 may be infrared sensing devices, light sensors or other sensing devices arranged to determine whether the clamshell electronic device 2000 are closed or opened according to the physical changes in response to open or close the upper cover and the lower cover. When the upper cover and the lower cover of the clamshell electronic device 2000 are separated, the process goes to step S502, otherwise, the sensing device 300 continuous to detect whether the upper cover and the lower cover of the clamshell electronic device 2000 are separated.

It should be noted that the clamshell electronic device 2000 of the present disclosure may be a tablet, wherein the tablet may achieve the feature of clamshell devices with an external device, the sensing device 300 can produce the detecting signal according to the physical change in response to the external device separating from the clamshell electronic device 2000, and transmit the detecting signal to the embedded controller 170. For example, the clamshell electronic device 2000 which is a tablet with a smart cover can achieve the feature of the clamshell electronic device. In other words, the smart cover may be the upper cover or the lower cover of the clamshell electronic device 2000. It should be noted that the smart cover may be regard as one of the components of the clamshell electronic device 2000, but it is not limited thereto. The smart cover may not include in the clamshell electronic device 2000 in other embodiments. Although the smart cover is not one of the components of the clamshell electronic device 2000, the sensing device 300 can also determine whether the smart cover is separated from the electronic device 2000 according to the above physical change for determining whether the upper cover and the lower cover are separated. The sensing device 300 is also arranged to produce the detecting signal, accordingly, and transmit the detecting signal to the embedded controller 170. In other embodiments, the clamshell electronic device 2000 which is a tablet may also combine with a keyboard or another tablet for having the feature of clamshell electronic devices. It should be noted that the keyboard or another tablet may be one of the components of the clamshell electronic device 2000, but it is not limited thereto. The keyboard or another tablet may not include in the clamshell electronic device 2000 in other embodiments.

Although the keyboard or another tablet is not one of the components of the clamshell electronic device 2000, the sensing device 300 can also determine whether the keyboard or another tablet is separated from the electronic device 2000 according to the above physical change for determining whether the upper cover and the lower cover are separated. The sensing device 300 is also arranged to produce the detecting signal, accordingly, and transmit the detecting signal to the embedded controller 170.

Next, in step S502, the sensing device 300 produces a detecting signal, and transmits the detecting signal to the embedded controller 170.

Next, in step S504, the processor 110 performs the basic input output system to increase the value of the separated number by 1 according to the detecting signal produced by the sensing device 300, wherein the separated number is stored in the read-only memory 150 and corresponds to the number of times that the upper cover and the lower cover are separated.

Next, in step S506, the operating system performed by the processor 110 determines whether the separated number of the read-only memory 150 is greater than a predetermined number. When the separated number is greater than the predetermined number, the process goes to step S510, otherwise, the step returns to step S500 and the sensing device 300 continuous to detect whether the upper cover and the lower cover of the clamshell electronic device 2000 are separated. It should be noted that the predetermined number may be 5, 10, 15, etc., but it is not limited thereto.

In step S510, the operating system performed by the processor 110 obtains the event number stored in the random-access memory 172 of the embedded controller 170 by the ACPI driver, and resets the separated number to zero. It should be noted that the processor 110 is arranged to perform the ASL code of the basic input output system according to the event number, and the ASL code enables a calibration program of the operating system to calibrate the touch module 200 for improving the accuracy of the determination of the touch event of the touch module 200. The processor 110 is further arranged to perform the ACPI driver of the operating system according to the event number to enable the operating system to reset the separated number of the read-only memory 150 to zero by the ACPI driver. The process ends at step S510.

Figure 6:
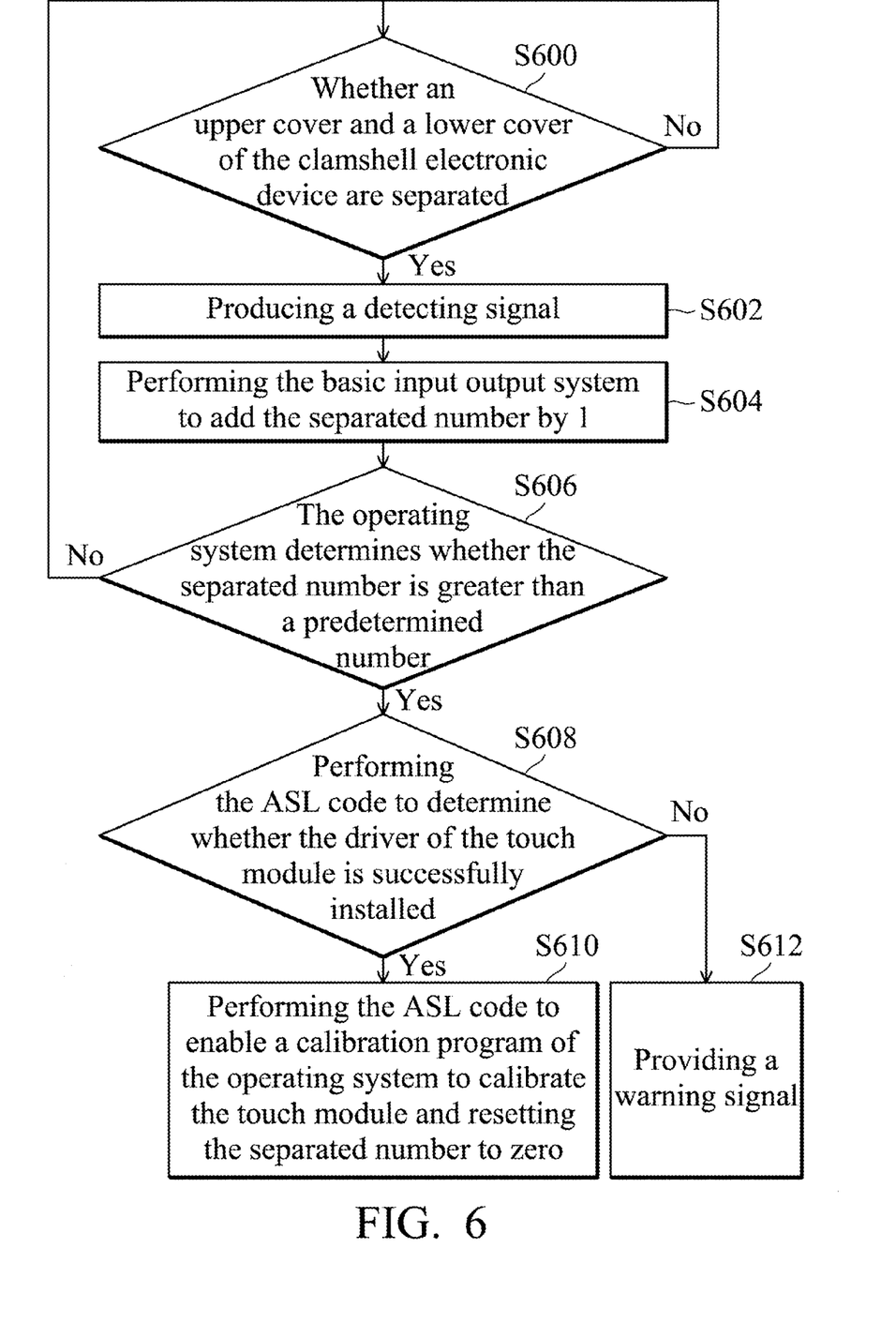
FIG. 6 is a flowchart of a calibration method according to another embodiment of the present disclosure.

FIG. 6 is a flowchart of a calibration method according to another embodiment of the present disclosure. The calibration method is applied to the clamshell electronic device 2000 of FIG. 2. The process starts at step S600, wherein the method of FIG. 6 is similar to the method of FIG. 5, except that the method of FIG. 6 further includes steps S608 and S612. Therefore, for the details of steps S600-S604, please refer to steps S500-S504 of FIG. 5.

In step S606, the operating system performed by the processor 110 determines whether the separated number stored in the read-only memory 150 is greater than a predetermined number. When the separated number is greater than the predetermined number, the process goes to step S608, otherwise, the process returns to step S600 and the sensing device 300 continuous to detect whether the upper cover and the lower cover of the clamshell electronic device 2000 are separated. It should be noted that the predetermined number may be 5, 10, 15, etc., but it is not limited thereto.

Next, in step S608, the operating system performed by the processor 110 obtains the event number stored in the random-access memory 172 of the embedded controller 170 by the ACPI driver to determine whether the driver of the touch module 200 is successfully installed on the operating system of the clamshell electronic device 2000. The processor 110 performs the ASL code of the basic input output system according to the event number, the ASL code is arranged to detect whether a device management interface of the operating system has an error code (Device Manager error code) corresponding to the touch module 200 or not to determine whether the driver of the touch module 200 is successfully installed on the operating system of the clamshell electronic device 2000. When the driver of the touch module 200 is successfully installed on the clamshell electronic device 2000, the process goes to step S610. Otherwise, the process goes to step S612.

In step S610, the ASL code enables a calibration program of the operating system to calibrate the touch module 200 for improving the accuracy of the touch module 200 and reset the separated number to zero. The process ends at step S610. For example, the processor 110 performs the ASL code of the basic input output system according to the event number to enable the operating system to reset the separated number of the read-only memory 150 to zero by the ACPI driver.

In step S612, the ASL code is arranged to provide a warning signal to the operating system. Furthermore, the operating system notices the users that the driver of the touch module 200 is not successfully installed on the clamshell electronic device 2000. The process ends at step S612.

The clamshell electronic device 1000/2000 and the calibration method of the present disclosure can automatically calibrate the touch module 200 after the users enable the clamshell electronic device 1000/2000 a predetermined times for improving the accuracy of the determination of the touch events and their position.

Data transmission methods, or certain aspects or portions thereof, may take the form of a program code (i.e., executable instructions) embodied in tangible media, such as floppy diskettes, CD-ROMS, hard drives, or any other machine-readable storage medium, wherein, when the program code is loaded into and executed by a machine such as a computer, the machine thereby become an apparatus for practicing the methods. The methods may also be embodied in the form of a program code transmitted over some transmission medium, such as electrical wiring or cabling, through fiber optics, or via any other form of transmission, wherein, when the program code is received and loaded into and executed by a machine such as a computer, the machine becomes an apparatus for practicing the disclosed methods. When implemented on a general-purpose processor, the program code combines with the processor to provide a unique apparatus that operates analogously to application-specific logic circuits.

While the disclosure has been described by way of example and in terms of the preferred embodiments, it is to be understood that the disclosure is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A clamshell electronic device, comprising:
a touch module, arranged to detect touch events;
a sensing device, arranged to detect whether an upper cover and a lower cover of the clamshell electronic device are separated, and produce a detecting signal when the upper cover and the lower cover are separated; and a calculation unit, arranged to count the number of times the upper cover and the lower cover are separated according to the detecting signal to obtain a separated number, and obtain an event number by an Advanced Configuration and Power Interface (ACPI) driver and calibrate the touch module according to the obtained event number when a predetermined condition is satisfied, wherein the predetermined condition comprises the separated number being greater than a predetermined number.

2. The clamshell electronic device as claimed in claim 1, wherein the calculation unit is further arranged to reset the separated number to zero when the separated number is greater than the predetermined number.

3. The clamshell electronic device as claimed in claim 2, wherein the calculation unit is further arranged to determine whether a driver of the touch module is successfully installed on the clamshell electronic device when the separated number is greater than the predetermined number.

4. The clamshell electronic device as claimed in claim 3, wherein when the driver is not successfully installed on the clamshell electronic device, the calculation unit is further arranged to provide a warning signal to users, and the predetermined condition further comprises that the driver is successfully installed on the clamshell electronic device.

5. The clamshell electronic device as claimed in claim 1, wherein the touch module is a touch panel or a touch pad.

6. A calibration method, applied to a clamshell electronic device, wherein the clamshell electronic device comprises a touch module, the calibration method comprises:

detecting whether an upper cover and a lower cover of the clamshell electronic device are separated;

producing a detecting signal when the upper cover and the lower cover are separated;

counting the number of times the upper cover and the lower cover are separated according to the detecting signal to obtain a separated number;

performing an operating system to obtain an event number by an Advanced Configuration and Power Interface (ACPI) driver and calibrating the touch module according to the obtained event number when a predetermined condition is satisfied, wherein the predetermined condition comprises that the separated number is greater than a predetermined number.

7. The calibration method as claimed in claim 6, further comprising resetting the separated number to zero when the separated number is greater than the predetermined number.

8. The calibration method as claimed in claim 7, further comprising:

determining whether a driver of the touch module is successfully installed on an operating system of the clamshell electronic device when the separated number is greater than the predetermined number; and providing a warning signal to the operating system when the driver is not successfully installed on the clamshell electronic device, wherein the predetermined condition further comprises that the driver is successfully installed on the clamshell electronic device.

* * * * *